(12) United States Patent
Gramann et al.

(10) Patent No.: US 12,712,410 B2
(45) Date of Patent: Aug. 18, 2026

(54) WINDING HEAD COOLING

(71) Applicant: Schaeffler Technologies AG & Co. KG, Herzogenaurach (DE)

(72) Inventors: Patrick Gramann, Renchen (DE); Michael Heilmann, Karlsruhe (DE); Bjarne Binder, Lahr (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 114 days.

(21) Appl. No.: 18/558,795

(22) PCT Filed: Apr. 12, 2022

(86) PCT No.: PCT/DE2022/100276
§ 371 (c)(1),
(2) Date: Nov. 3, 2023

(87) PCT Pub. No.: WO2022/233359
PCT Pub. Date: Nov. 10, 2022

(65) Prior Publication Data

US 2024/0258870 A1 Aug. 1, 2024

(30) Foreign Application Priority Data

May 5, 2021 (DE) .......................... 102021111700.3

(51) Int. Cl.
*H02K 5/20* (2006.01)
*H02K 5/15* (2006.01)
*H02K 9/19* (2006.01)

(52) U.S. Cl.
CPC ............... *H02K 5/203* (2021.01); *H02K 5/15* (2013.01); *H02K 9/19* (2013.01)

(58) Field of Classification Search
CPC H02K 5/203; H02K 5/15; H02K 9/19; H02K 3/24
See application file for complete search history.

(56) References Cited

U.S. PATENT DOCUMENTS

2012/0025638 A1* 2/2012 Palafox .................... H02K 9/10 310/52
2018/0054107 A1* 2/2018 Leonardi ................ H02K 9/193
2019/0386538 A1* 12/2019 Koerner ................... H02K 9/02

FOREIGN PATENT DOCUMENTS

WO 2020120611 A1 6/2020

* cited by examiner

*Primary Examiner* — Dominick L Plakkoottam
(74) *Attorney, Agent, or Firm* — Volpe Koenig

(57) ABSTRACT

A dynamoelectric machine having a stator having a substantially cylindrical or hollow-cylindrical stator body, a rotor arranged substantially coaxially with the stator, two ring elements, of which in each case one is arranged on each end face of the stator body. Each ring element has inlet nozzles through which a cooling fluid can be sprayed onto the winding heads of the stator. Penetration of the cooling fluid into the air gap of the machine is prevented in that each ring element radially and axially encloses the winding heads arranged on the respective end face, such that the winding heads are encased in an annular space bounded by the respective ring element and the respective end side of the stator body.

16 Claims, 9 Drawing Sheets

4
7
6

7
5
2
1
3

WINDING HEAD COOLING

CROSS-REFERENCE TO RELATED APPLICATIONS

This application is the U.S. National Phase of PCT Appln. No. PCT/DE2022/100276, filed Apr. 12, 2022, which claims the benefit of German Patent Appln. No. 102021111700.3, filed May 5, 2021, the entire disclosures of which are incorporated by reference herein.

TECHNICAL FIELD

The disclosure relates to a dynamoelectric machine. An electric machine according to the disclosure can be used, for example, to drive an electric vehicle.

BACKGROUND

Power loss occurs in the active operation of electric machines. This power loss generates heat that must be dissipated in order to prevent damage to the active and passive parts of the machine. In particular in the field of electromobility, very high energy densities are sought for electric machines in order to allow for traction drives offering high levels of performance with limited installation space. Such energy densities usually require active cooling, since dissipation of the generated heat via free convection with the ambient air is generally not capable of achieving the necessary heat removal. Such active cooling can, for example, be provided by a moving fluid, in particular by a cooling fluid. In an electric machine designed as an internal rotor, for example, a cooling jacket is provided which encloses the external stator of the machine and has cooling channels through which a cooling fluid flows. The cooling jacket is shrunk onto the stator, for example, in order to make the heat transfer from the stator laminated core to the cooling medium as efficient as possible.

A typical hotspot in the stator of electrical machines is often the winding heads protruding axially from the stator laminated core. If the maximum permissible temperature is exceeded, the insulation can be destroyed and a short circuit can occur in the winding head area. Accordingly, the operating range of an electric machine can be significantly expanded and its energy density increased through efficient heat dissipation of the winding heads.

DE 102019216125 A1 discloses a stator of an electric machine having a laminated core which is arranged axially between a first and a second end plate. At least one opening is arranged in each of the respective end plates, which opening is designed to spray a coolant onto winding heads of the stator.

SUMMARY

The disclosure is based on the object of optimizing the fluid flow in electric machines with active winding head cooling.

This object is achieved by a dynamoelectric machine having the features according to claim 1. Advantageous embodiments of the disclosure can be found in the dependent claims.

The dynamoelectric machine according to the disclosure comprises a stator having a substantially cylindrical or hollow-cylindrical stator body. A rotor of the dynamoelectric machine is substantially arranged coaxially with this stator. A ring element is arranged on each end face of the stator.

Each of these ring elements has inlet nozzles, through which a cooling fluid can be sprayed onto the winding heads of the stator.

The special feature of these ring elements is that they radially and axially enclose the winding heads arranged on the respective end face. Here, the winding heads are encased in an annular space bounded by the respective ring element and the respective end face of the stator body. This encasement ensures that the cooling fluid, which is, for example, a cooling liquid, in particular an oil, cannot get into the air gap formed between the rotor and stator. This solution keeps the cooling fluid away from the rotor without having to provide a seal for this purpose.

The inlet nozzles can be arranged distributed at radially different positions over the circumference of the ring element. In an advantageous embodiment of the disclosure, radially adjacently positioned inlet nozzles can be arranged so that they can spray radially stacked conductors of the winding heads. If, for example, four conductors are arranged radially one above the other in the grooves of the stator, for example in the form of solid rod conductors, in particular rod waveguides, four different layers can be provided for the radial positions of the inlet nozzles. Each position is intended for spraying one of the four conductors.

In an advantageous embodiment of the disclosure, each of the ring elements has a collecting channel. This can be arranged in such a way that the cooling fluid sprayed onto the winding heads via the inlet nozzles drains into the collecting channel and is thus prevented from penetrating the air gap of the machine.

The dynamoelectric machine can also have two end face housing sections. Said ring elements can each be arranged between an end face of the stator body and one of the housing sections in such a way that a cavity remains between each ring element and the associated housing section, which can be filled with the cooling fluid via at least one inlet. This cavity can be connected to the annular space via the inlet nozzles, so that the cavity serves as a coolant reservoir that provides the coolant that can be sprayed onto the winding heads via the inlet nozzles. The housing sections can be designed as bearing shields of the electric machine.

The cavity formed between the respective housing section and the respective ring element can also be annular. Alternatively, each cavity can be divided into circular arc-shaped cavity segments via radially and axially extending partition walls arranged on the respective ring element. By dividing the cavity into several circular arc-shaped cavity segments, a more homogeneous spraying of the winding heads can be ensured. Alternatively, the partition walls can also be provided on the housing section, for example on a bearing shield.

In a further advantageous embodiment of the disclosure, each ring element can have outlet openings distributed around the circumference. Each housing section may include a drainage channel and a drainage opening. In this embodiment of the disclosure, the inlet nozzles, the outlet openings, the drainage channel and the drainage opening are arranged such that the cooling fluid sprayed through the inlet nozzles onto the winding heads can be directed via the outlet openings from the annular space into the drainage channel integrated in the housing section designed in particular as a bearing shield, and from there to the drainage opening.

The outlet openings can thus be integrated into the collecting channel.

In order to ensure in such an embodiment that the cooling fluid sprayed onto the winding heads is dissipated from the annular space as effectively as possible, the outlet openings in the collecting channel are circumferentially separated from one another by separating webs. The separating webs extend into the annular space in the radial and axial directions.

As a rule, it is not only necessary to cool the stator of the electrical machine in the area of the winding heads, it is also necessary to dissipate heat from its entire cylindrical outer contour. Cooling jackets with, for example, meandering cooling channels are often provided for this purpose, which are shrunk onto the stator laminated core. A particularly effective cooling of the stator body can be ensured by the fact that it has substantially axially extending bores which are circumferentially distributed over an outer lateral surface of the stator body and form stator cooling channels. In an advantageous embodiment of the disclosure, these stator cooling channels can now be connected to the annular space via the inlet nozzles to form a common cooling circuit. The redirection of the cooling fluid from the stator cooling channels into the cavity between the housing sections and the ring elements can be realized, for example, by deflection channels that are integrated in the housing sections. Bearing shields can be provided as housing sections which have these deflection channels on their side facing the laminated core.

The disclosure is explained in more detail below using the exemplary embodiments shown in the figures.

DETAILED DESCRIPTION

Figure 1:
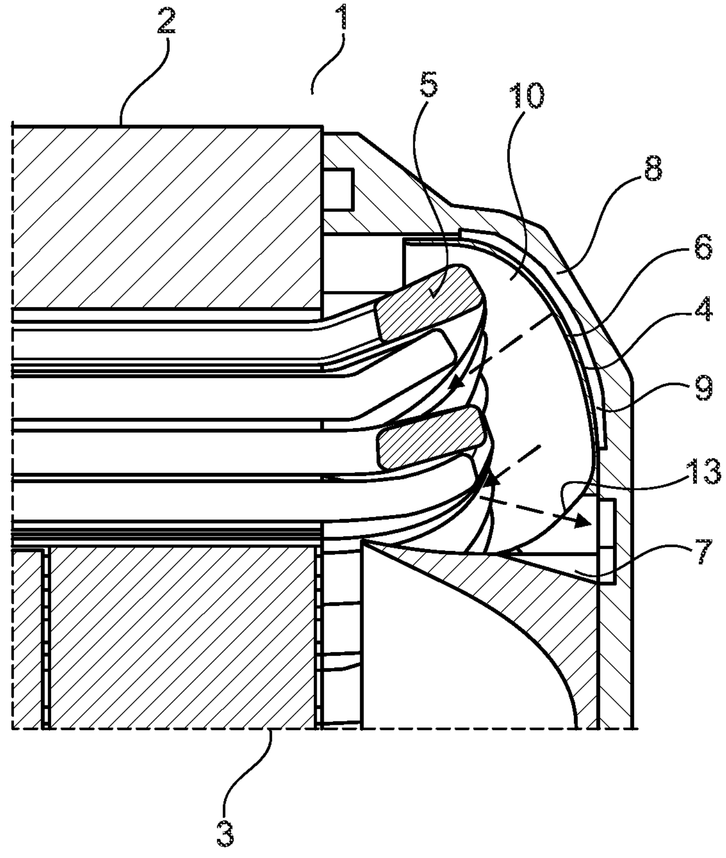
FIG. 1 shows a schematic representation of a cooling fluid flow in a dynamoelectric machine according to an embodiment of the disclosure.
Figure 3:
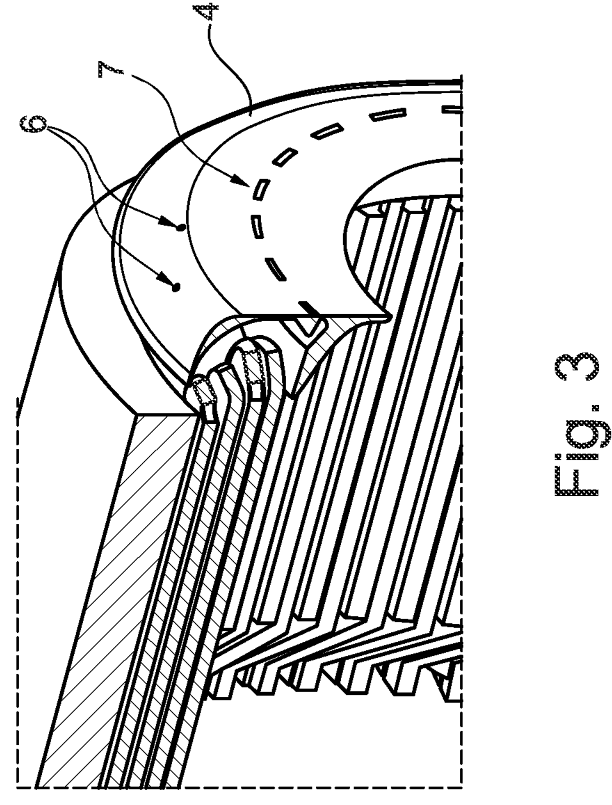
FIG. 3 shows a 3D view of the dynamoelectric machine according to FIG. 1.
Figure 2:
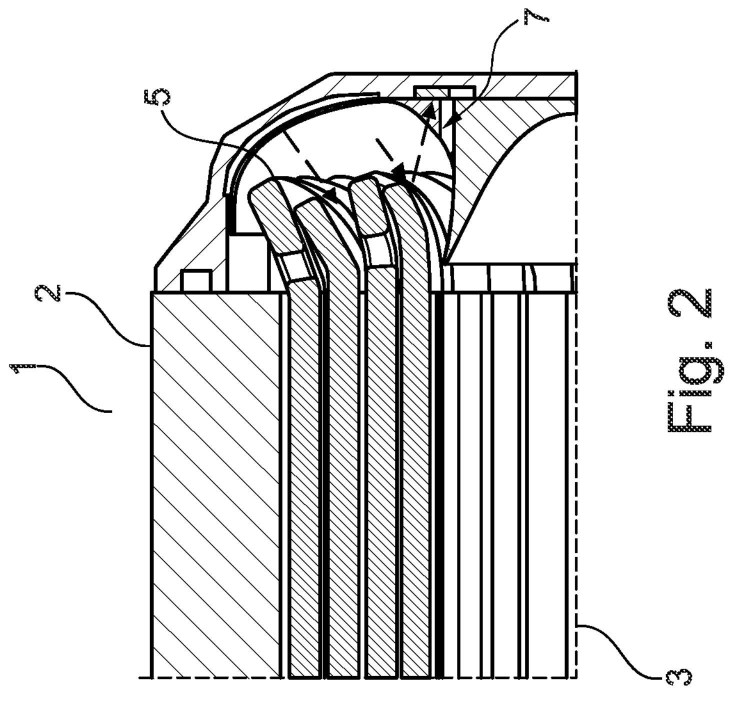
FIG. 2 shows a cross-section of the dynamoelectric machine according to FIG. 1.

FIG. 1 shows a schematic representation of a cooling fluid flow in a dynamoelectric machine according to an embodiment of the disclosure. FIG. 2 shows a cross section and FIG. 3 shows a 3D view of this dynamoelectric machine.

The machine comprises a stator 1 with a stator body 2 designed as a stator laminated core, which has substantially axially extending grooves into which a stator winding is inserted. The machine further comprises a rotor 3, which is arranged substantially coaxially with the stator 1 and is spaced from the stator 1 via an air gap. FIGS. 1 and 2 show a cross section of the machine at an end face. Winding heads 5 protrude from the stator body 2 at this end face and at the opposite end face (not shown). These winding heads 5 are surrounded radially and axially by a ring element 4. Through this ring element 4, the winding heads are encased in an annular space 10 on the respective end face of the stator body 2. Within this annular space 10, the winding heads 5 are sprayed with a coolant, for example an oil. This oil enters the annular space 10 through inlet nozzles 6. The inlet nozzles 6 are arranged radially in such a way that at least one inlet nozzle 6 is provided for each layer of conductors in the winding head area. Several inlet nozzles 6 are arranged distributed around the circumference in each radial position.

The ring element 4 is surrounded by an end face housing section 8, which is designed as a bearing shield of the dynamoelectric machine. Viewed axially, there is a cavity 9 between the bearing shield and the ring element 4. Within this cavity 9, there is a reservoir of liquid coolant, which enters the cavity 9 through an inflow (not shown). This coolant is sprayed from the cavity 9 onto the winding heads 5 within the annular space 10 through the inlet nozzles 6. The coolant drips from the winding heads 5 and lands in a collecting channel 13 of the ring element 4. Outlet openings 7 are arranged circumferentially distributed within this collecting channel 13, from which the coolant can finally flow out of the annular space 10 again.

Figure 4:
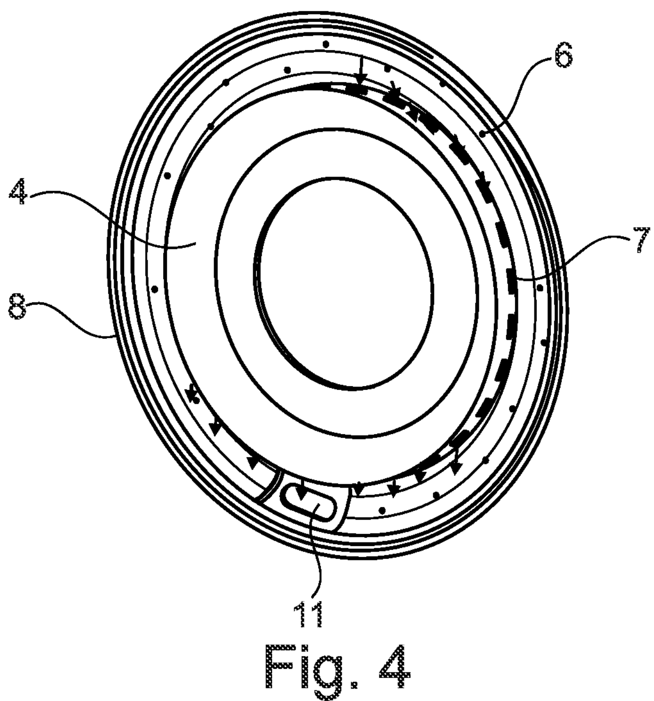
FIG. 4 shows a ring element and a housing section according to an embodiment of the disclosure.
Figure 5:
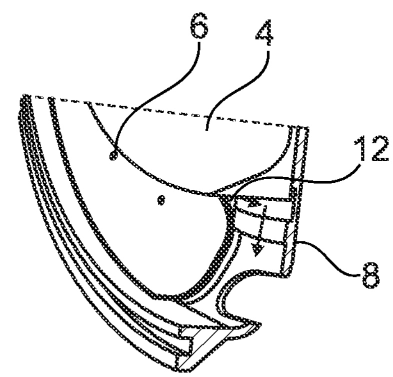
FIG. 5 shows an enlarged section of the ring element according to FIG. 4.
Figure 6:
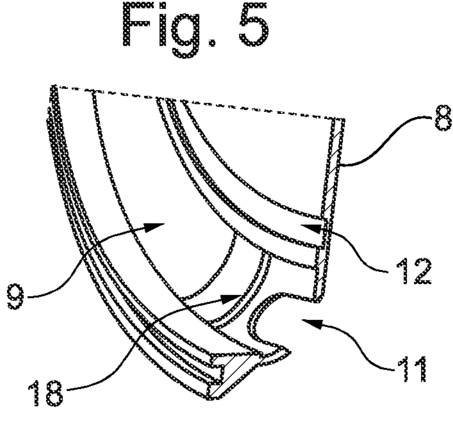
FIG. 6 shows an enlarged section of the housing element according to FIG. 4.

FIG. 4 shows a ring element 4 and a housing section 8 according to an embodiment of the disclosure. FIG. 5 shows an enlarged section of the ring element 4 according to FIG. 4 and FIG. 6 shows an enlarged section of the housing element 8 according to FIG. 4. In addition, the coolant flow is illustrated in FIGS. 4 to 6 using arrows. As can be seen in FIG. 4, the coolant sprayed into the annular space 10 through the inlet nozzles 6 flows out of the annular space 10 through the outlet openings 7 in the upper region of the annular element 4 after it has wetted the winding heads 5. From there, it enters a drainage channel 12, which can be seen in FIG. 5 and is located between the ring element 4 and the housing section 8. The coolant injected in the upper region of the ring element 4 ultimately flows through this drainage channel 12 to a drainage opening 11, which is located at the bottom of the housing section 8. From there, the coolant can be fed to a heat exchanger, for example.

As can be seen in FIG. 4, the coolant injected into the upper half of the annular space flows through the outlet openings 7 into the drainage channel 12. In the lower region of the annular space, however, the coolant entering the outlet openings in the upper region flows out of the drainage channel 12 again and finally leaves the annular space 10 via the drainage opening 11.

In FIG. 6, a cavity 9 can be seen within the housing section 8, which is designed here as a bearing shield. This cavity 9 forms a reservoir for the coolant. If the ring element 4 is placed on the bearing shield, the coolant can finally reach the annular space 10 through the inlet nozzles 6 and spray the winding heads 5 there (see FIG. 5). The bearing shield comprises a seal 18 which is arranged around the drainage opening 11 within the cavity 9 in order to prevent the coolant escaping from the cavity 9, which serves as a coolant reservoir, directly to the drain 11.

Figure 7:
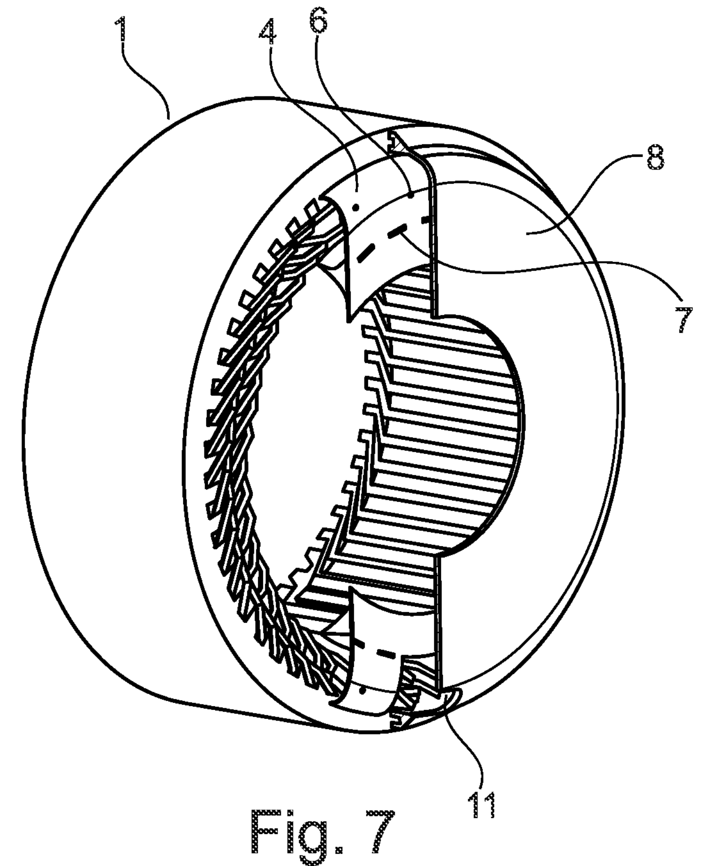
FIG. 7 shows a 3-dimensional representation of a stator of the dynamoelectric machine according to FIG. 1 with the ring element and the housing section of one end face.
Figure 8:
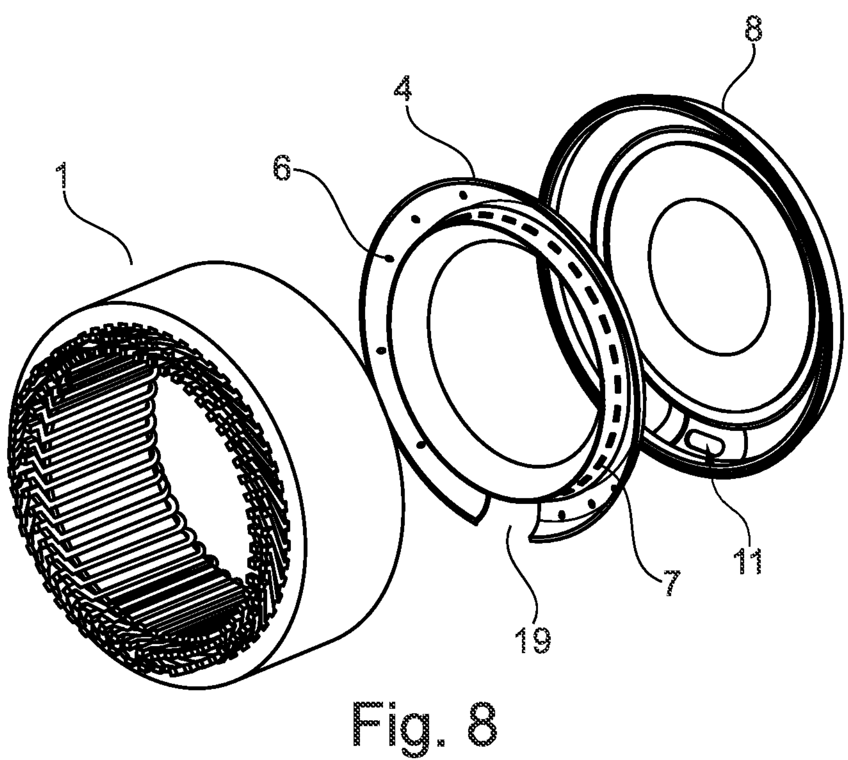
FIG. 8 shows an exploded view of the stator, ring element and housing sections from FIG. 7

FIG. 7 shows a three-dimensional representation of a stator 1 of the dynamoelectric machine according to FIG. 1 with the ring element 4 and the housing section of one end face designed as a bearing shield. FIG. 8 shows an exploded view of the stator 1, ring element 4 and housing sections 8 from FIG. 7. FIG. 8 clearly shows that the ring element 4 has a recess 19 in its lower area at six o'clock. Through this recess 19, the cooling fluid can reach the drainage opening 11 in the bearing shield and from there be fed to a heat exchanger, for example.

Figure 9:
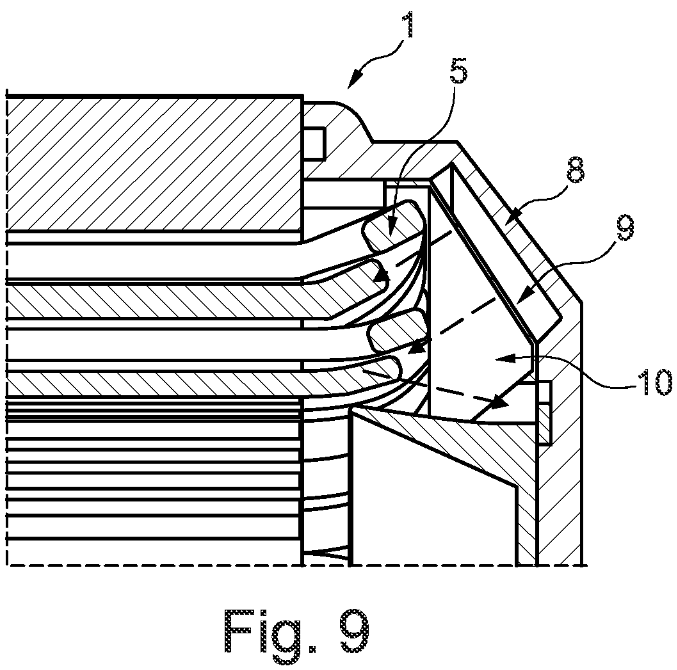
FIG. 9 shows a schematic representation of a cooling fluid flow in a dynamoelectric machine according to a further embodiment of the disclosure.
Figure 10:
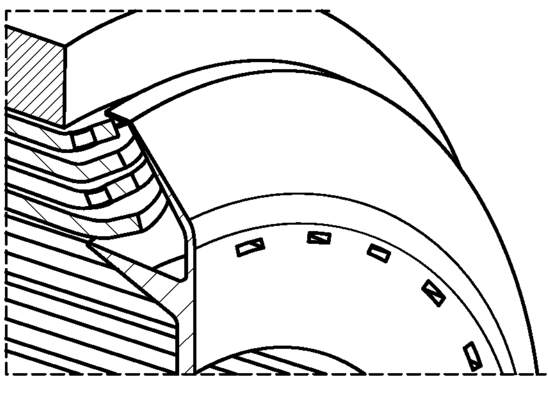
FIG. 10 shows a 3D view of the dynamoelectric machine according to FIG. 9.

FIG. 9 shows a schematic representation of a cooling fluid flow in a dynamoelectric machine according to a further embodiment of the disclosure. FIG. 10 shows a 3D view of the dynamoelectric machine according to FIG. 9. Functionally identical elements are provided with the same reference numerals as those used for the previously illustrated embodiment. Substantially, this embodiment differs in the shape of the housing section 8, which is also designed here as a bearing shield, and the geometric shape of the ring element 4. Ring element 4 and bearing shield are designed with a slightly more angular shape compared to the embodiment according to FIGS. 1 to 3.

Figure 11:
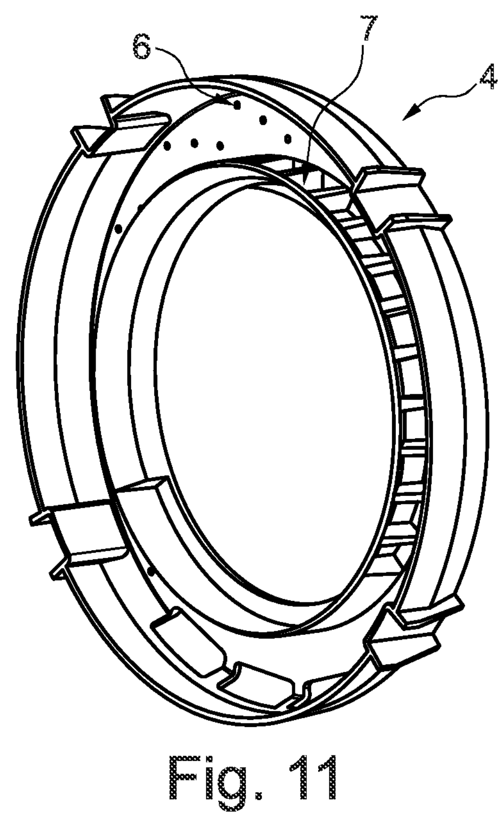
FIG. 11 shows a further embodiment of a ring element.
Figure 12:
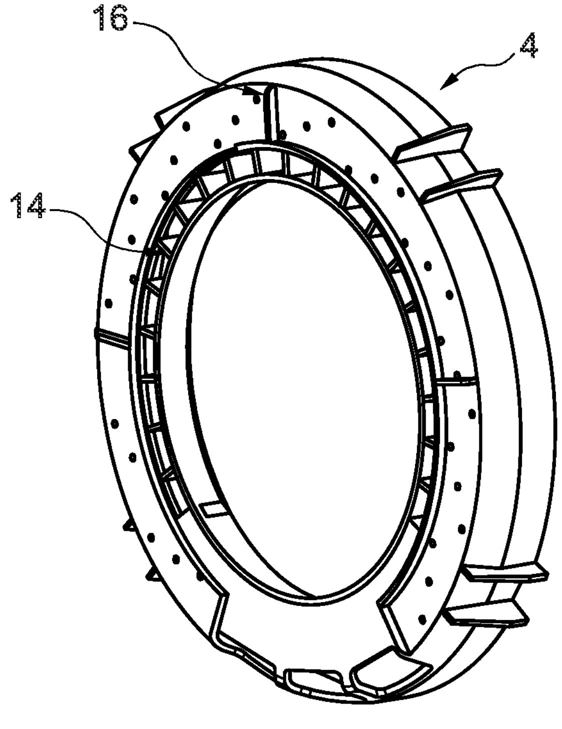
FIG. 12 shows an alternative perspective of the ring element according to FIG. 11.
Figure 13:
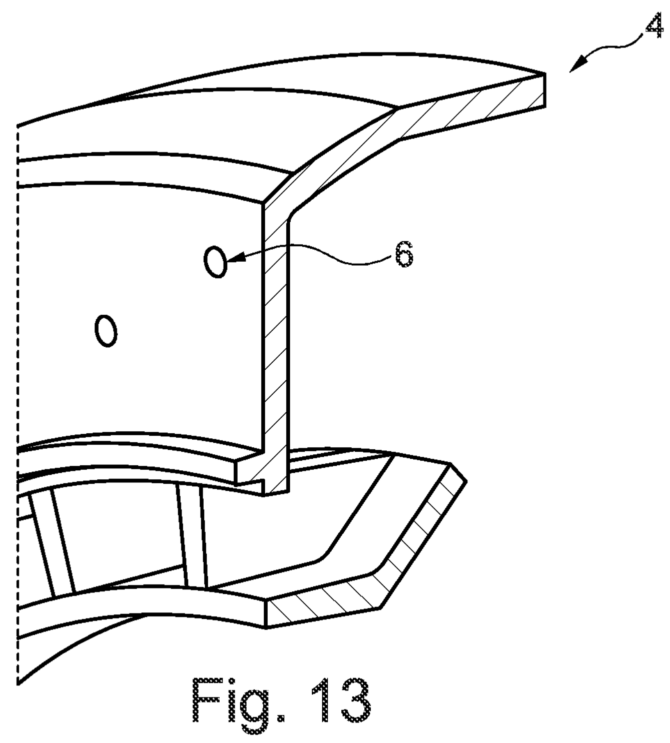
FIG. 13 shows a section of the ring element according to FIG. 11.
Figure 14:
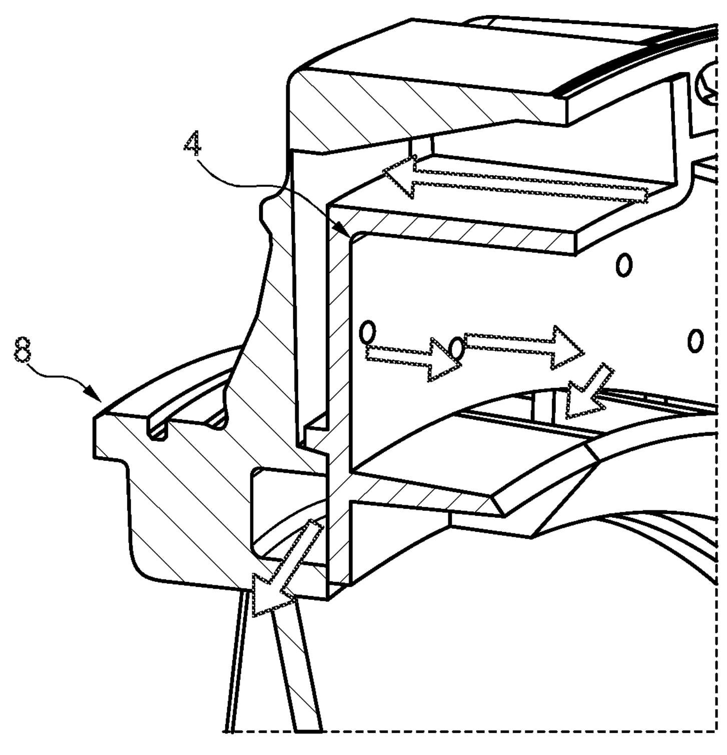
FIG. 14 shows a section of the ring element according to FIG. 11 with an associated housing section.

FIG. 11 shows a further embodiment of a ring element 4. FIG. 12 shows an alternative perspective of this ring element. FIG. 13 shows a section of the ring element 4 according to FIG. 11 and FIG. 14 shows a section of the ring element according to FIG. 11 with an associated housing section 8. The embodiment of a ring element 4 shown here is characterized by separating webs 14, which, viewed in the circumferential direction, adjoin each outlet opening 7 of the ring element 4 and extend in the axial and radial directions. These separating webs 14 ensure that the coolant injected in the upper region into the annular space through the inlet nozzles 6 passes directly from the outlet openings 7 into the drainage channel 12 after the winding heads 5 have been wetted. The coolant is therefore prevented from initially continuing to flow along the collecting channel 13 after absorbing the heat from the winding heads 5. In this way, the exchange of the coolant in the annular space 10 is accelerated and the heat dissipation of the winding heads 5 is thus further improved. FIG. 12 also shows partition walls 16, which extend in the axial direction on the side of the ring elements 4 facing the end face housing sections 8 and thus divide the cavity 9 between the ring element 4 and the associated housing section 8, in particular designed as a bearing shield, into individual circular arc-shaped segments. This subdivision helps to distribute the coolant more homogeneously over the circumference in the coolant reservoir provided by the individual segments.

Figure 15:
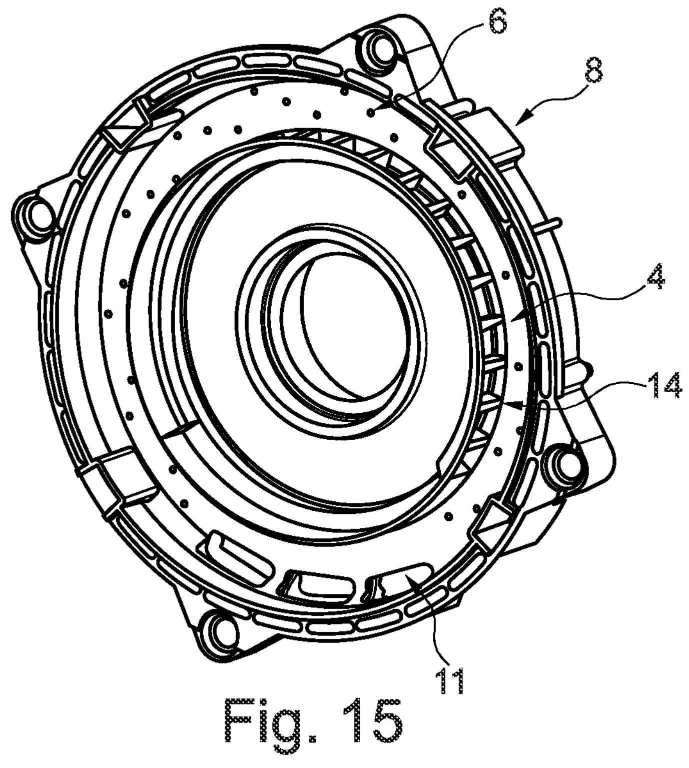
FIG. 15 shows a view of the ring element according to FIG. 11 inserted into the associated housing section.
Figure 16:
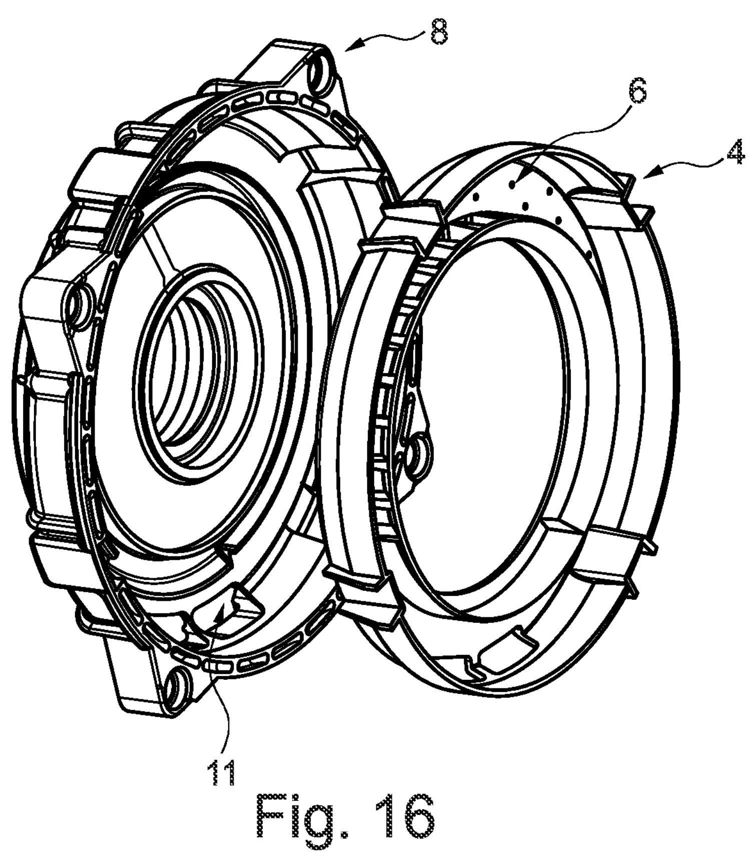
FIG. 16 shows an exploded view of the ring element and housing section according to FIG. 15.
Figure 17:
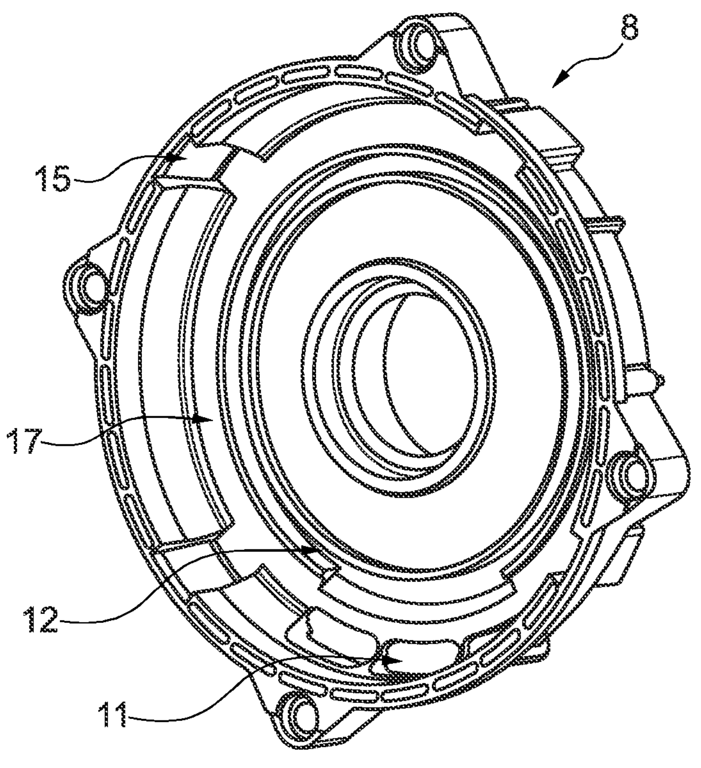
FIG. 17 shows the housing section according to FIGS. 15 and 16 and FIG. 18 shows a coolant flow within the housing section according to FIG. 17.
Figure 18:
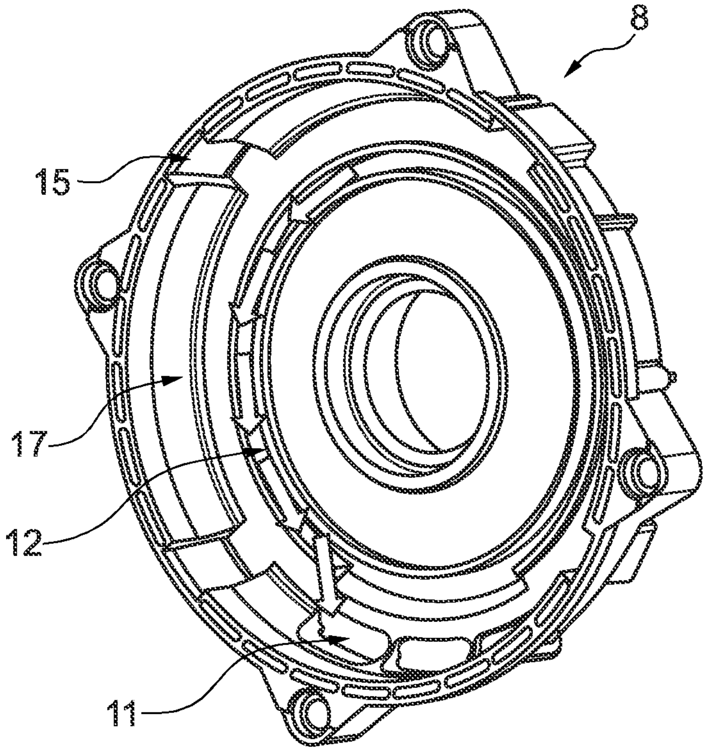

FIG. 14 shows a section of the ring element 4 according to FIG. 11 with an associated housing section 8. Both elements can be seen again in an exploded view in FIG. 16. The housing section 8 is shown separately again in FIGS. 17 and 18, with the coolant flow within the housing section 8 being visible in FIG. 18. FIG. 15 provides an insight into the ring element 4 inserted into the housing section 8 designed as a bearing shield in the annular space 10 created between the end face of the stator (not shown), and the ring element 4. It can be clearly seen here how a coolant sprayed through the inlet nozzles 6 is guided through the separating webs 14 in the area above the axis of symmetry of the dynamoelectric machine directly into the drainage channel 12, from where it flows to the outlet openings 7, which are located below the axis of symmetry of the stator, drips into the collecting channel 13 and from there reaches the drainage opening 11 through recesses in the ring element 4. FIG. 18 helps to explain the coolant flow within the bearing shield. At an inlet 15, which is connected, for example, to cooling channels running axially in the stator body, the coolant first enters an inlet ring 17. This inlet ring 17 forms the cavity 9 and thus the coolant reservoir from which the coolant passes through the inlet nozzles 6 into the annular space 10. From there it drips into the collecting channel 13 and passes through the outlet openings 7 into the drainage channel 12 integrated in the bearing shield. The coolant runs along there and finally leaves the bearing shield at the drainage opening 11.

The invention claimed is:

1. A dynamoelectric machine comprising:

a stator having a substantially cylindrical body with end faces including winding heads, a rotor arranged substantially within the stator, two ring elements, each ring element arranged on a respective end face of the stator body, wherein each ring element has inlet nozzles, through which a cooling fluid can be sprayed onto the winding heads of the stator, wherein each ring element radially and axially encloses the winding heads of each respective end face, so that the winding heads are encased in an annular space bounded by the respective ring element and the respective end face of the stator body, and two end face housing sections, the ring elements each being arranged between an end face of the stator body and one of the end face housing sections such that between each ring element and associated end face housing section, a cavity is defined which can be filled with the cooling fluid via at least one inlet, the cavity being connected to the annular space via the inlet nozzles.

2. The dynamoelectric machine according to claim 1, wherein the inlet nozzles are arranged at radially different positions distributed over a circumference of each ring element such that radially adjacently positioned inlet nozzles can spray radially stacked conductors of the winding heads.

3. The dynamoelectric machine according to claim 1, wherein the ring elements each have a collecting channel arranged so the cooling fluid sprayed onto the winding heads drains into the collecting channel and is prevented from penetrating an air gap of the machine.

4. The dynamoelectric machine according to claim 1, wherein the end face housing sections are configured as bearing shields.

5. The dynamoelectric machine according to claim 1, wherein each cavity is divided into circular arc-shaped cavity segments via radially and axially extending partition walls arranged on the respective ring element.

6. The dynamoelectric machine according to claim 1, wherein each ring element comprises circumferentially distributed outlet openings, and each end face housing section comprises a drainage channel and a drainage opening, wherein the inlet nozzles, the outlet openings, the drainage channel and the drainage opening are arranged such that the cooling fluid sprayed through the inlet nozzles onto the winding heads can be directed via the outlet openings from the annular space into the drainage channel, and from there to the drainage opening.

7. The dynamoelectric machine according to claim 6, wherein the outlet openings are integrated into the collecting channel.

8. The dynamoelectric machine according to claim 7, wherein the outlet openings in the collecting channel are circumferentially separated from one another by separating webs which extend in radial and axial directions into the annular space.

9. The dynamoelectric machine according to claim 1, wherein the stator body has substantially axially extending bores which are distributed circumferentially over an outer lateral surface of the stator body and form stator cooling channels, wherein the stator cooling channels are connected to the annular space via the inlet nozzles to form a common cooling circuit.

10. The dynamoelectric machine according to claim 1, wherein the cavity is formed between an external surface of the ring element and the end face housing section.

11. The dynamoelectric machine according to claim 1, wherein the end face housing sections are each arranged on a respective end face.

12. The dynamoelectric machine according to claim 1, wherein each end face housing section and a respective ring are axially coextensive.

13. A ring element for enclosing winding heads of an end face of an associated dynamoelectric machine having a stator body, the ring element comprising: inlet nozzles through which a cooling fluid can be sprayed onto the winding heads of the stator; wherein the ring element is configured to radially and axially enclose winding heads of the associated dynamoelectric machine so that the winding heads are encased in an annular space bounded by the ring element and an end face of the stator body of the associated dynamoelectric machine, wherein the ring element has a collecting channel formed entirely by the ring element arranged so the cooling fluid sprayed onto the winding heads drains into the collecting channel and is prevented from penetrating an air gap of the associated dynamoelectric machine, and wherein the ring element comprises circumferentially distributed outlet openings integrated into the collecting channel.

14. The ring element according to claim 13, wherein the inlet nozzles are arranged at radially different positions distributed over a circumference the ring element such that radially adjacently positioned inlet nozzles can spray radially stacked conductors of the winding heads.

15. The ring element according to claim 13, wherein the outlet openings in the collecting channel are circumferentially separated from one another by separating webs which extend in radial and axial directions.

16. The ring element according to claim 13, wherein the outlet openings are in a planar axial end face of the ring element.

* * * * *